US010378646B2

(12) United States Patent
Yuma et al.

(10) Patent No.: US 10,378,646 B2
(45) Date of Patent: Aug. 13, 2019

(54) SHIFT CONTROL SYSTEM FOR VEHICLE AND SHIFT CONTROL METHOD FOR VEHICLE

(71) Applicant: TOYOTA JIDOSHA KABUSHIKI KAISHA, Toyota-shi, Aichi-ken (JP)

(72) Inventors: Takashi Yuma, Toyokawa (JP); Koki Ueno, Toyota (JP); Masato Tateno, Toyota (JP); Yusuke Nakade, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 15/794,777

(22) Filed: Oct. 26, 2017

(65) Prior Publication Data

US 2018/0172144 A1 Jun. 21, 2018

(30) Foreign Application Priority Data

Dec. 16, 2016 (JP) .................................. 2016-244788

(51) Int. Cl.
*F16H 61/12* (2010.01)
*B60W 10/11* (2012.01)
*B60W 10/04* (2006.01)
*B60W 30/18* (2012.01)
*F16H 59/08* (2006.01)
(Continued)

(52) U.S. Cl.
CPC ............. *F16H 61/12* (2013.01); *B60W 10/04* (2013.01); *B60W 10/11* (2013.01); *B60W 30/18* (2013.01); *F16H 59/08* (2013.01); *F16H 59/105* (2013.01); *B60W 2520/10* (2013.01); *B60W 2540/16* (2013.01); *B60W 2710/1005* (2013.01); *B60W 2710/188* (2013.01); *F16H 59/44* (2013.01); *F16H 63/3458* (2013.01); *F16H 2061/124* (2013.01); *F16H 2061/1208* (2013.01); *F16H 2061/1232* (2013.01); *F16H 2061/1244* (2013.01); *F16H 2061/1284* (2013.01); *Y10T 477/675* (2015.01)

(58) Field of Classification Search
CPC ........ F16H 61/12; F16H 59/08; F16H 59/105; F16H 2061/1244; F16H 2061/124; F16H 2061/1208; F16H 2061/1284; F16H 2061/1232; F16H 59/44; B60W 10/04; B60W 10/11; B60W 2710/1005; B60W 2520/10; B60W 2540/16; Y10T 477/675
USPC .......................................................... 701/63
See application file for complete search history.

(56) References Cited

U.S. PATENT DOCUMENTS 7,584,681 B2 * 9/2009 Kozaki ................. F16H 59/105
74/335
9,410,616 B2 * 8/2016 Shibata ............... F16H 59/0204
(Continued)

FOREIGN PATENT DOCUMENTS

CN    1530571 A    9/2004
JP    2001-289084 A    10/2001
(Continued)

*Primary Examiner* — Roger L Pang
(74) *Attorney, Agent, or Firm* — Oliff PLC

(57) ABSTRACT

A shift range is selected based on a vehicle speed or acceleration of a vehicle and a shift range kept by a drive unit at the time when it is determined that there is a malfunction in shift sensors. Thus, it is possible to avoid a disabled self-propelled state resulting from a change into a neutral range through a fail-safe operation and keep limp home running.

4 Claims, 8 Drawing Sheets

(51) Int. Cl.
*F16H 59/10* (2006.01)
*F16H 59/44* (2006.01)
*F16H 63/34* (2006.01)

(56) References Cited

U.S. PATENT DOCUMENTS

| | | | |
|---|---|---|---|
| 10,180,184 B2* | 1/2019 | Tsutsumi | G01D 5/2033 |
| 2001/0039232 A1 | 11/2001 | Ehrmaier et al. | |
| 2004/0162661 A1 | 8/2004 | Kikuchi | |
| 2005/0126322 A1* | 6/2005 | Kozaki | F16H 59/105 |
| | | | 74/335 |
| 2011/0202231 A1* | 8/2011 | Ueno | F16H 61/12 |
| | | | 701/29.2 |

FOREIGN PATENT DOCUMENTS

| | | |
|---|---|---|
| JP | 2010-120394 A | 6/2010 |
| JP | 2010-151302 A | 7/2010 |
| JP | 2011-163782 A | 8/2011 |
| JP | 2016-038002 A | 3/2016 |
| WO | 2013/179997 A1 | 12/2013 |
| WO | 2016/020739 A1 | 2/2016 |

* cited by examiner

SHIFT CONTROL SYSTEM FOR VEHICLE AND SHIFT CONTROL METHOD FOR VEHICLE

INCORPORATION BY REFERENCE

The disclosure of Japanese Patent Application No. 2016-244788 filed on Dec. 16, 2016 including the specification, drawings and abstract is incorporated herein by reference in its entirety.

BACKGROUND

1. Technical Field

The disclosure relates to malfunction determination in shift position detection with a shift control system and a shift control method for a vehicle, which has the function of detecting a shift operating position of a shift operating unit.

2. Description of Related Art

There is suggested a shift position detector that detects a shift operating position of a shift operating unit. The shift position detector detects a shift operating position on the basis of signals (output voltages) that are respectively output from four sensors. The position sensor described in Japanese Patent Application Publication No. 2016-038002 (JP 2016-038002 A) is an example of the shift position detector. In JP 2016-038002 A, even when there occurs a malfunction in one of the four sensors, control is executed such that limp home running is enabled by detecting the shift operating position of the shift operating unit with the remaining three sensors. In addition, when any two of these three sensors output signals for a shift operating position in which a vehicle travels in a direction opposite to the direction in which the vehicle is traveling, it is determined that there is a malfunction, and control is executed such that erroneous forward or reverse traveling is prevented by changing a drive unit to a neutral range.

SUMMARY

Incidentally, in JP 2016-038002 A, while the vehicle is traveling with the use of the three normal sensors, when any two of the three sensors output signals to a shift position in which the vehicle travels in a direction opposite to the direction in which the vehicle is traveling in a current shift range, a fail-safe operation is executed by setting the drive unit to the neutral range in order to reliably prevent traveling in the opposite direction due to an erroneous forward/reverse switching operation. However, when the drive unit is uniformly changed into the neutral range in the event of occurrence of sensor failure, the vehicle is disabled to be propelled by itself, with the result that it may be difficult to ensure limp home running from a failure occurrence place to a remote vehicle stopping place.

The disclosure provides a shift control system and a shift control method for a vehicle, which is able to ensure limp home running from a failure occurrence place to a remote vehicle stopping place even when it is determined that the number of normal sensors is two or less while the vehicle including the shift control system that determines a shift position of a shift operating unit on the basis of signals that are respectively output from at least three sensors is traveling.

An aspect of the disclosure provides a shift control system for a vehicle. The shift control system includes at least three sensors, a shift operating unit, and an electronic control unit. The electronic control unit is configured to determine a shift position of the shift operating unit based on signals that are respectively output from the at least three sensors. When the electronic control unit determines that the number of normal sensors is two or less among the sensors and a vehicle speed of the vehicle is higher than or equal to a preset vehicle speed threshold, the electronic control unit is configured to select a shift position kept at the time of the determination. When the electronic control unit determines that the number of normal sensors is two or less among the sensors and the vehicle speed of the vehicle is lower than the vehicle speed threshold, the electronic control unit is configured to select a neutral position.

With the shift control system according to the aspect of the disclosure, in the shift control system for a vehicle, which determines the shift position of the shift operating unit on the basis of signals that are respectively output from the at least three sensors, when it is determined that the number of normal sensors is two or less among the sensors, and when a vehicle speed of the vehicle is higher than or equal to the preset vehicle speed threshold, the shift position kept at the time of the determination is selected. On the other hand, when it is determined that the number of normal sensors is two or less among the sensors, and when the vehicle speed of the vehicle is lower than the vehicle speed threshold, the neutral position is selected. Therefore, when it is determined that the number of normal sensors is two or less, and when the vehicle speed of the vehicle is higher than or equal to the preset vehicle speed threshold, it is possible to ensure limp home running from a failure occurrence place to a remote vehicle stopping place. When the vehicle speed of the vehicle becomes lower than the vehicle speed threshold, the neutral position is selected, so it is possible to safely stop with the neutral range.

In the shift control system according to the above aspect, the electronic control unit may be configured to keep a parking position when the shift position kept at the time of the determination is the parking position.

According to the above aspect, when the shift position kept at the time of the determination is the parking position, it is possible to prevent a change into an unnecessary shift position by keeping the parking position.

In the shift control system according to the above aspect, when the shift position is other than a parking position or the neutral position, the electronic control unit may be configured to limit a driving force such that an acceleration of the vehicle becomes lower than a preset acceleration threshold.

According to the above aspect, when the shift position is other than the parking position or the neutral position, a driving force is limited such that the acceleration of the vehicle becomes lower than the preset acceleration threshold. Thus, it is possible to continue traveling while suppressing an increase in vehicle speed and ensure safe limp home running.

Another aspect of the present disclosure provides a shift control method for a vehicle. The vehicle includes at least three sensors, and a shift operating unit. The shift control method includes: determining a shift position of the shift operating unit based on signals that are respectively output from the at least three sensors; when the electronic control unit determines that the number of normal sensors is two or less among the sensors and a vehicle speed of the vehicle is higher than or equal to a preset vehicle speed threshold, selecting a shift position kept at the time of the determination; and when the electronic control unit determines that the number of normal sensors is two or less among the sensors and the vehicle speed of the vehicle is lower than the vehicle speed threshold, selecting a neutral position.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the disclosure will be described in detail with reference to the accompanying drawings.

Figure 1:
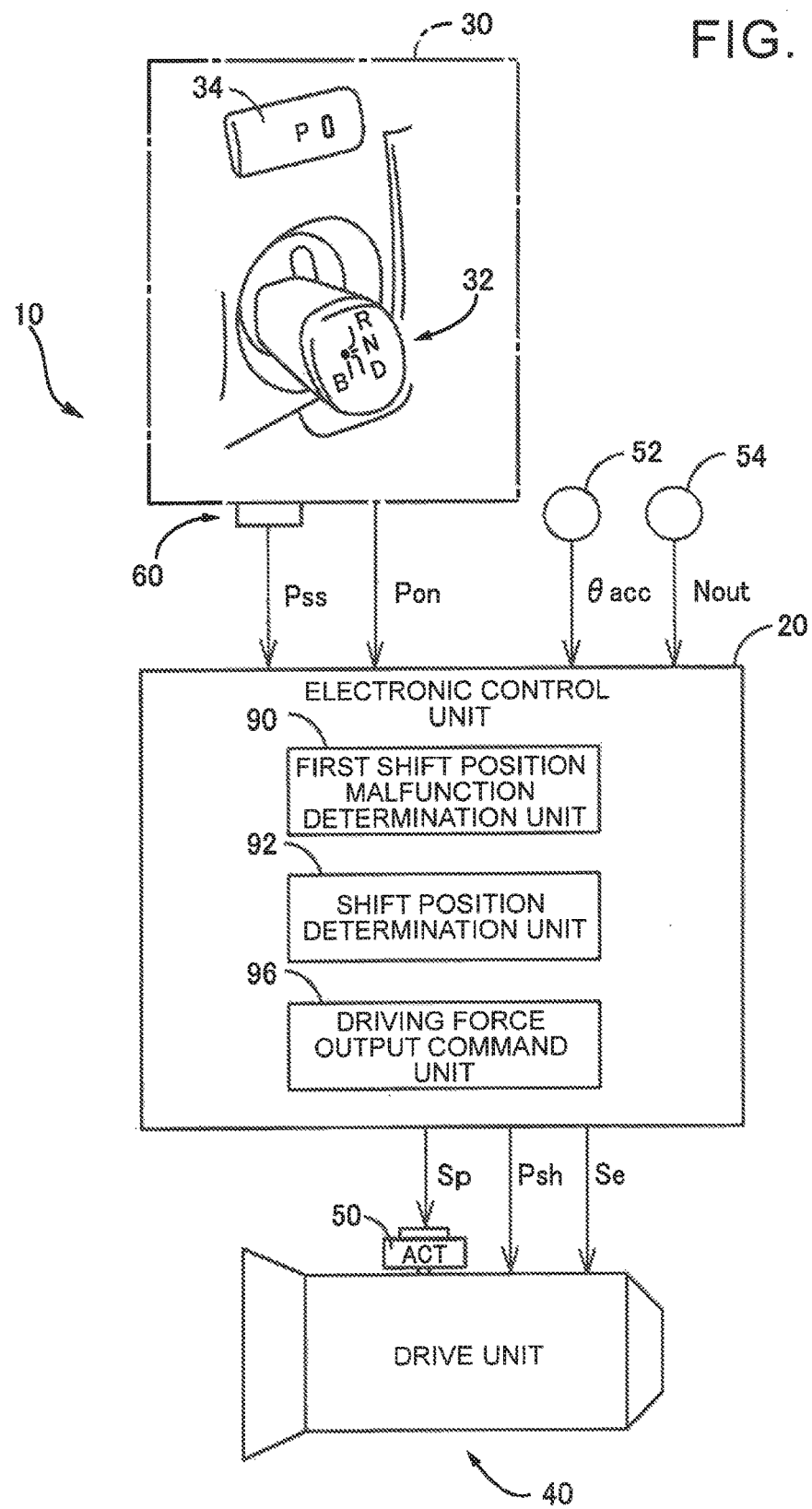
FIG. 1 is a view that illustrates the schematic configuration of a shift control system for a vehicle according to an embodiment of the disclosure.

FIG. 1 is a view that illustrates the schematic configuration of a shift control system 10 for a vehicle according to the embodiment. The shift control system 10 includes an electronic control unit 20, a shift operating device 30, a drive unit 40, and the like. The shift control system 10 functions as the shift-by-wire shift control system 10 that electrically changes the shift range of the drive unit 40. In the following description, an example in which the shift control system 10 according to the aspect of the disclosure is applied to a hybrid vehicle including an engine and an electric motor as driving force sources will be described. However, the shift control system 10 according to the aspect of the disclosure may be applied to a vehicle of another type, such as an engine vehicle and an electric vehicle. The electronic control unit 20 corresponds to the electronic control unit according to the aspect of the disclosure.

The electronic control unit 20 includes a plurality of so-called microcomputers each consisting of a CPU, a ROM, a RAM, input/output interfaces, and the like. Each CPU executes signal processing in accordance with programs prestored in the ROM while utilizing the temporary storage function of the RAM. Thus, the electronic control unit 20 executes drive control, such as hybrid drive control associated with an engine (not shown) or a motor MG provided in the drive unit 40, control for changing the shift range of the drive unit 40 by using a shift-by-wire system, and the like.

For example, a plurality of signals including a shift position signal Pss (shift operating position signal) and a P switch signal Pon, that is, for example, an accelerator operation amount θacc (%), an output shaft rotation speed Nout (rpm), and the like, are supplied to the electronic control unit 20. The shift position signal Pss is supplied from a position sensor (hereinafter, a Hall IC is the position sensor) for detecting a shift position (shift operating position) of a shift lever 32 (which corresponds to the shift operating unit according to the aspect of the disclosure; hereinafter, the shift operating unit is the shift lever). The P switch signal Pon is supplied from a P switch 34 for changing the shift position of the drive unit 40 between a parking position (P range) and a non-P position other than the parking position when operated by a driver. The accelerator operation amount θacc (%) is detected by an accelerator operation amount sensor 52. The output shaft rotation speed Nout (rpm) corresponds to a vehicle speed V (Km/h), and is detected by an output shaft rotation sensor 54.

For example, a driving force command signal Se, a shift range signal Psh, a P change control command signal Sp, and the like, are output from the electronic control unit 20. The driving force command signal Se is used to issue a command to operate the engine and the electric motor in the drive unit 40. The shift range signal Psh is used to change the shift range of the drive unit 40. The P change control command signal Sp is used to issue a command to operate a parking lock device 50.

Figure 2:
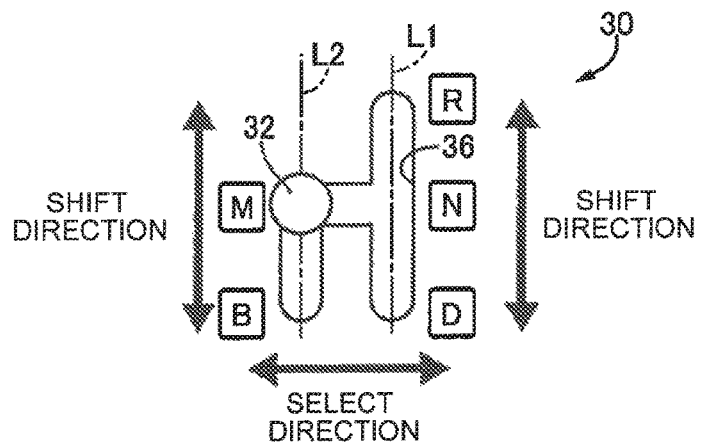
FIG. 2 is a view that shows the outline of a shift operating device that is operated by a shift lever shown in FIG. 1.

FIG. 2 shows an example of the outline of the shift operating device 30 that is operated with the use of the shift lever 32 shown in FIG. 1. In FIG. 2, the P switch 34 is not shown. The shift operating device 30 is, for example, arranged near a driver seat, and includes the momentary shift lever 32 that is operated to a plurality of the shift positions Ps. The momentary type is such a type that, when driver's operation of the shift lever 32 is cancelled, the shift lever 32 automatically returns to a middle position (M position) set in advance.

As shown in FIG. 2, the shift lever 32 is allowed to be moved in a shift direction parallel to a vehicle longitudinal direction and a select direction parallel to a vehicle width direction along a shift gate 36. In the shift operating device 30, the shift lever 32 is allowed to be operated in the shift direction along a first line L1 and be operated in the shift direction along a second line L2 parallel to the first line L1. Three shift positions Ps, that is, an R position (R position), a neutral position (N position) and a D position (D position), are set in the first line L1. In the R position, the shift range is changed to a reverse traveling range. In the neutral position (N position), power transmission is interrupted. In the D position, the shift range is changed to a forward traveling range. Two operating positions, that is, a middle position (M position) and a B position (B position), are set in the second line L2. The shift lever 32 is automatically returned to the middle position (M position) after being operated. In the B position, engine brake is generated. A select operation of the shift lever 32 is allowed between the M position and the N position. A neutral range, a drive range, a reverse range and an engine brake range are control modes of the drive unit 40, and are respectively established on the basis of a determination as to whether the shift position Ps is the N position, the D position, R position or the B position. Therefore, the neutral range, the drive range, the reverse range and the engine brake range substantially respectively indicate the N position, the D position, the R position and the B position.

Figure 3:
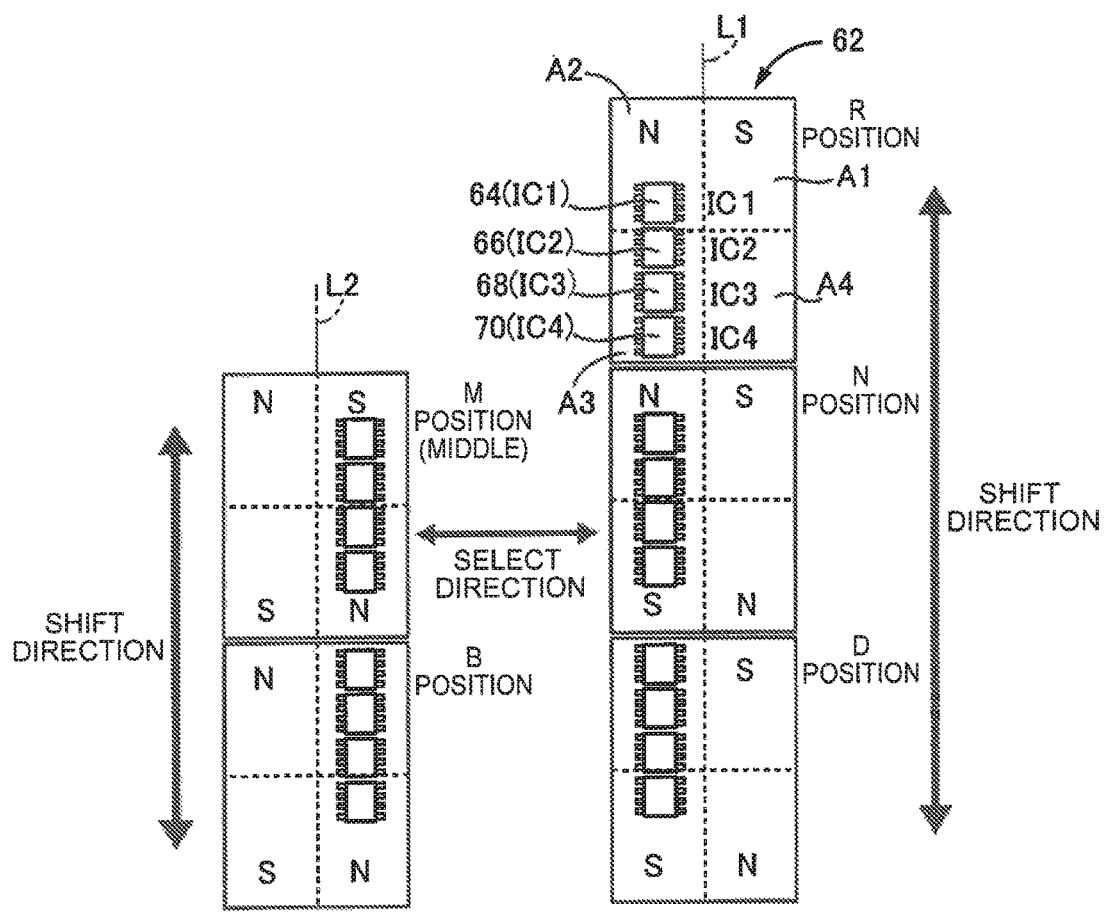
FIG. 3 is a view that shows a basic configuration of a shift position detector that detects a shift operating position of the shift lever that is operated by the shift operating device shown in FIG. 2.

FIG. 3 illustrates the basic hardware configuration of a shift position detector 60 that detects the shift position Ps of the shift lever 32 that is operated in the shift operating device 30 shown in FIG. 2. The shift position detector 60 includes a single magnet 62 and four Hall ICs 64 (hereinafter, IC1), Hall IC 66 (hereinafter, IC2), Hall IC 68 (hereinafter, IC3) and Hall IC 70 (hereinafter, IC4). The magnet 62 is provided integrally at the lower end of the shift lever 32. The magnet 62 moves integrally with the shift lever 32 as the shift lever 32 is operated. The four Hall ICs 64, 66, 68, 70 are immovably arranged on a substrate (not shown) so as to face the lower face of the magnet 62. Because the four Hall ICs are arranged below the magnet 62 and are difficult to be visually recognized, the four Hall ICs are shown in FIG. 3 for the sake of convenience such that the relative position of each of the four Hall ICs with respect to the magnet 62 is seen. The shift position detector 60 includes the magnet 62, the Hall IC 64, the Hall IC 66, the Hall IC 68, the Hall IC 70 and the electronic control unit 20 (described later).

FIG. 3 will be further described. FIG. 3 shows the relative position between the magnet 62 and each Hall IC when the shift lever 32 is operated to one of the shift positions Ps corresponding to FIG. 3. Therefore, it appears from FIG. 3 that the magnet 62 and the Hall ICs are provided for each shift position Ps. However, actually, the shift operating device 30 is formed of the single magnet 62 and the four Hall ICs, and the magnet 62 is displaced relative to the four Hall ICs as the shift lever 32 is operated.

As shown in FIG. 3, the Hall ICs are arranged in line along the shift direction at equal intervals. Therefore, the shift lever 32 is configured to be operable in the shift direction and the select direction. In the shift direction, the shift lever 32 is operated along the direction in which the Hall ICs are arranged. The select direction is perpendicular to the shift direction. The magnet 62 provided integrally with the shift lever 32 is formed in a rectangular shape, and is magnetized such that an N pole and an S pole are adjacent to each other in the vertical direction and in the horizontal direction. As a result, the magnet 62 is divided into four magnetic pole areas indicated by the dashed lines in FIG. 3. More specifically, where the first line L1 side in the select direction is a right side, the second line L2 side in the select direction is a left side, the R position side in the shift direction is an upper side and the B position and D position side in the shift direction is a lower side, the top left side and bottom right side of the magnet 62 are N poles, and the top right side and bottom left side of the magnet 62 are S poles. Hereinafter, the top right area of the magnet 62 is defined as an area A1 (S pole), the top left area of the magnet 62 is defined as an area A2 (N pole), the bottom left area of the magnet 62 is defined as an area A3 (S pole) and the bottom right area of the magnet 62 is defined as an area A4 (N pole).

Figure 4:
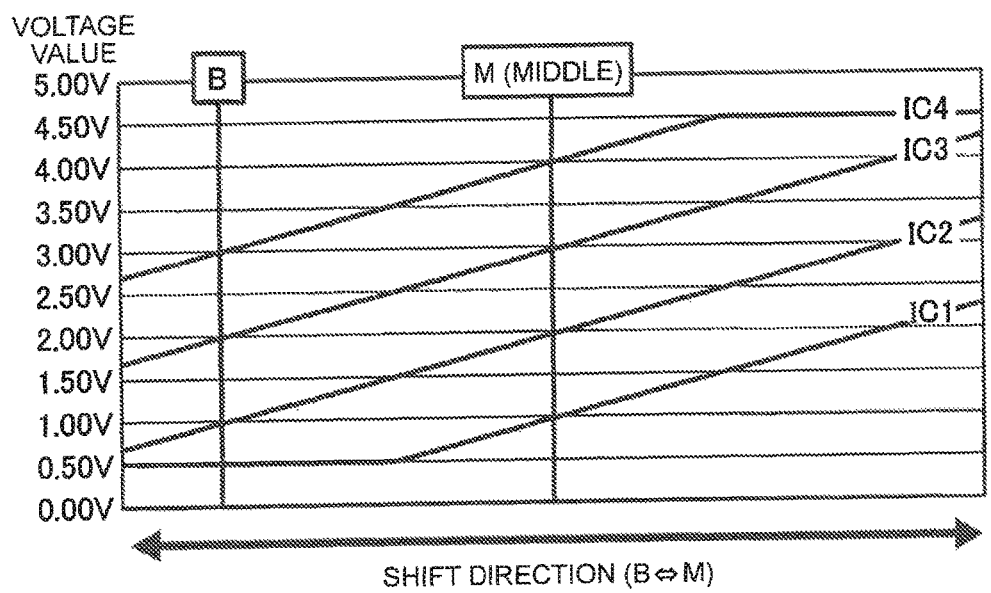
FIG. 4 is a view that shows voltages that are respectively output from sensors when the shift lever is operated to shift between a B position and an M position in FIG. 3.

When the shift lever 32 is operated to each shift position Ps along the shift gate 36, the relative position between the magnet 62 and the Hall ICs is the state shown in FIG. 4. For example, when the shift lever 32 is placed in the M position (neutral), the area A1 of the magnet 62 faces IC1 and IC2, and the area A4 faces IC3 and IC4. When the shift lever 32 is shifted from the M position to the B position, the area A1 of the magnet 62 faces IC 1 to IC3 and the area A4 faces IC4 as the magnet 62 is relatively moved to the lower side in FIG. 3 with respect to the Hall ICs. When the shift lever 32 is operated in the shift direction and in the select direction from the M position toward the R position, the area A2 of the magnet 62 faces IC and the area A3 faces IC2 to IC4 as the magnet 62 is relatively moved to the top right side in FIG. 3 with respect to the Hall ICs. When the shift lever 32 is operated in the select direction from the M position toward the N position, the area A2 of the magnet 62 faces IC and IC2 and the area A3 faces IC3 and IC4 as the magnet 62 is relatively moved to the right side in FIG. 3 with respect to the Hall ICs. When the shift lever 32 is operated in the shift direction and in the select direction from the M position toward the D position, the area A2 of the magnet 62 faces IC 1 to IC3 and the area A3 faces IC4 as the magnet 62 is relatively moved to the bottom right side in FIG. 3 with respect to the Hall ICs.

Figure 5:
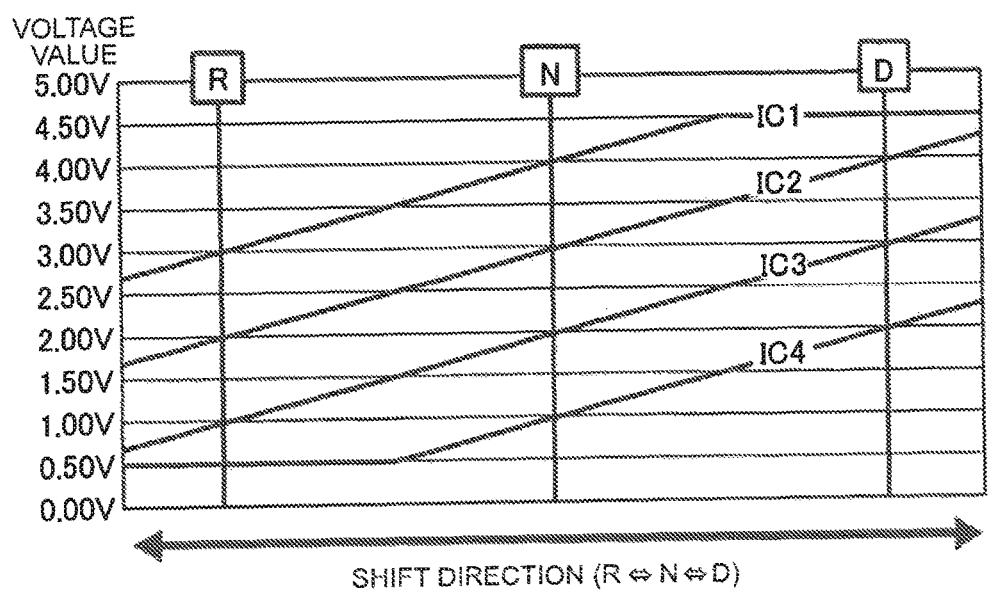
FIG. 5 is a view that shows voltages that are respectively output from the sensors when the shift lever is operated to shift between an R position and a D position in FIG. 3.

FIG. 4 shows voltages that are respectively output from the Hall ICs when the shift lever 32 is shifted between the B position and the M position in FIG. 3. The electronic control unit 20 includes an A/D converter that converts an analog voltage that is output from each Hall IC to a digital signal that can be handled by a computer. FIG. 5 and the following drawings show voltages converted to digital signals. In FIG. 5, the abscissa axis represents the position of the shift lever 32 when the shift lever 32 is moved in the shift direction along the second line L2, and the ordinate axis represents voltages that are respectively output from the Hall ICs in the corresponding position.

As shown in FIG. 4, voltages that are respectively output from the Hall ICs are positively proportional as the shift lever 32 moves from the B position toward the M position along the second line L2. Even when the shift lever 32 is placed in any position in the second line L2, a voltage that is output from IC1 is lower than a voltage that is output from IC2, a voltage that is output from IC2 is lower than a voltage that is output from IC3 and a voltage that is output from IC3 is lower than a voltage that is output from IC4 (IC 1<IC2<IC3<IC4). In this way, the Hall ICs output signal voltages (voltages) based on a relative position (relative distance) to the magnet 62, and respectively output different voltages for each position of the shift lever 32.

As shown in FIG. 4, when the shift lever 32 is placed in the M position (middle position), a voltage of about 1.00 V is output from IC1, a voltage of about 2.00 V is output from IC2, a voltage of about 3.00 V is output from IC3, and a voltage of about 4.00 V is output from IC4. When the shift lever 32 is placed in the B position, a voltage of about 0.5 V is output from IC1, a voltage of about 1.00 V is output from IC2, a voltage of about 2.00 V is output from IC3, and a voltage of about 3.00 V is output from IC4.

FIG. 5 shows voltage values that are respectively output from the Hall ICs when the shift lever 32 is shifted between the R position and the D position in FIG. 3. As shown in FIG. 5, voltage values that are respectively output from the Hall ICs are positively proportional as the shift lever 32 moves from the R position toward the D position along the first line L1. Even when the shift lever 32 is placed in any position in the first line L1, a voltage value that is output from IC4 is lower than a voltage value that is output from IC3, a voltage value that is output from IC3 is lower than a voltage value that is output from IC2 and a voltage value that is output from IC2 is lower than a voltage value that is output from IC1 (IC4<IC3<IC2<IC1). In this way, the Hall ICs respectively output different voltage values.

As shown in FIG. 5, when the shift lever 32 is placed in the R position, a voltage of 0.5 V is output from IC4, a voltage of about 1.00 V is output from IC3, a voltage of about 2.00 V is output from IC2, and a voltage of about 3.00 V is output from IC1. When the shift lever 32 is placed in the N position, a voltage of about 1.00 V is output from IC4, a voltage of about 2.00 V is output from IC3, a voltage of about 3.00 V is output from IC2, and a voltage of about 4.00 V is output from IC1. When the shift lever 32 is placed in the D position, a voltage of about 2.00 V is output from IC4, a voltage of about 3.00 V is output from IC3, a voltage of about 4.00 V is output from IC2, and a voltage of about 4.50 V is output from IC1.

The reason why the relative relation among voltages that are respectively output from the Hall ICs (magnitude relation: IC4<IC3<IC2<IC1) when the shift lever 32 moves along the first line L1 is inverted from the relative relation among voltages that are respectively output from the Hall ICs (magnitude relation: IC1<IC2<IC3<IC4) when the shift lever 32 moves along the second line L2 is that, when the shift lever 32 is operated in the select direction, polarities that face the Hall ICs are inverted.

Figure 6:
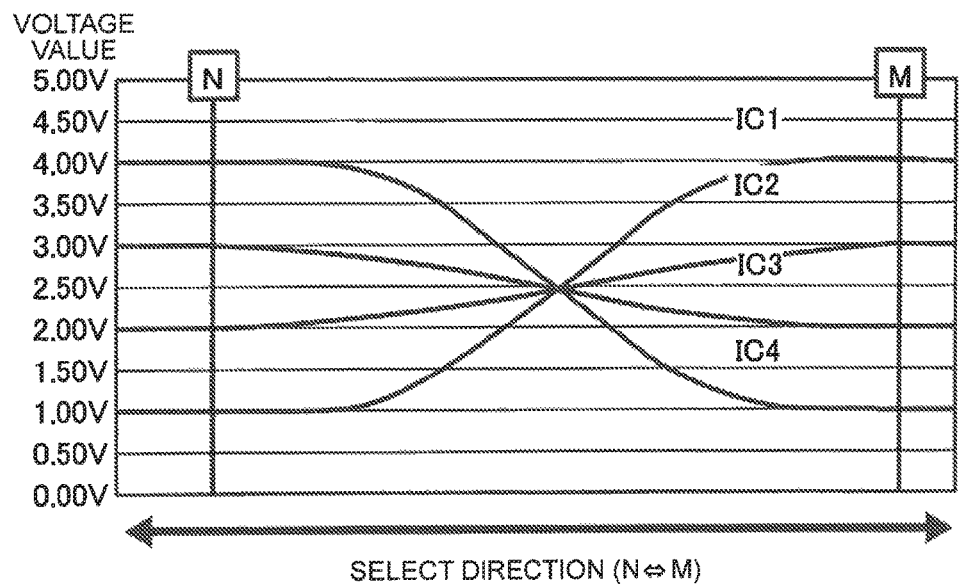
FIG. 6 is a view that shows voltages that are respectively output from the sensors when the shift lever is operated to shift between an N position and the M position in FIG. 3.

FIG. 6 shows voltages that are respectively output from the Hall ICs when the shift lever 32 is moved in the select direction between the M position and the N position. As is apparent from FIG. 3, when the shift lever 32 is operated in the select direction, the polarities of the magnet 62, facing the Hall ICs, are inverted, so the relative relation (magnitude relation) among the output voltages of the Hall ICs are inverted due to the inversion of the polarities.

Figure 7:
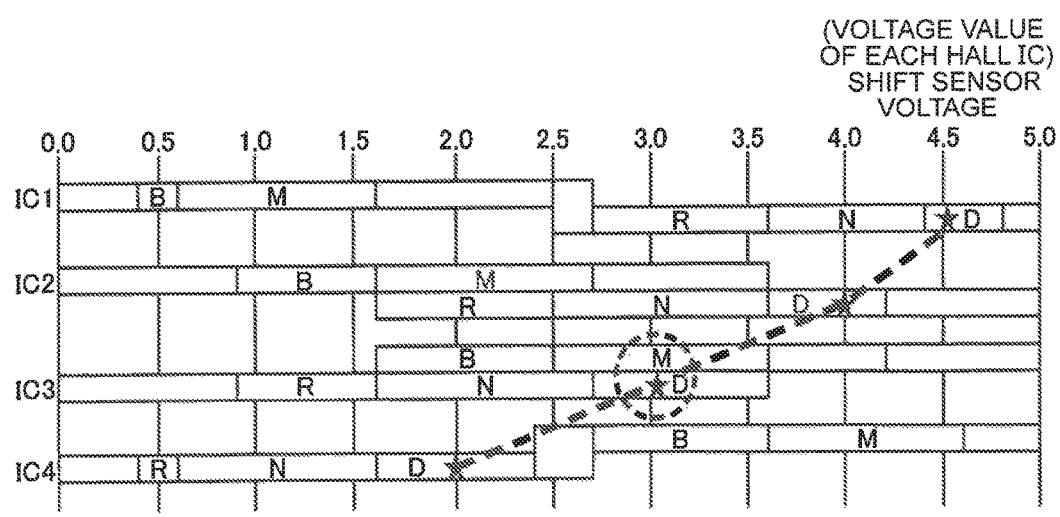
FIG. 7 is a relational map that summarizes the relationships between shift positions and voltage values, shown in FIG. 4 to FIG. 6.

FIG. 7 is a map of the correspondence relationship between each shift position Ps and voltage values (shift sensor voltages) that are respectively output from the Hall ICs, and corresponds to the relationships between the shift positions Ps and voltage values, shown in FIG. 4 to FIG. 6. The map of FIG. 7 is set and stored in advance. The shift position Ps of the shift lever 32 is determined on the basis of the voltage values that are actually respectively output from the Hall ICs by consulting the map. The reason why each voltage value has a range for each shift position Ps is that variations in voltage values that are respectively output from the Hall ICs are taken into consideration.

Therefore, different voltages are respectively output from the Hall ICs in correspondence with the shift position Ps of the shift lever 32. For example, when the output of IC1 falls within the range of a voltage of about 0.6 V to 1.6 V, it is determined that the shift position Ps is the M position. When the output of IC2 falls within the range of a voltage of about 1.6 V to 2.7 V or when the output of IC3 falls within the range of a voltage of about 2.5 V to 3.6 V or when the output of IC4 falls within the range of a voltage of about 3.6 V to 4.6 V, it is determined that the shift position Ps is the M position. When the shift position Ps is a position other than the M position, that is, the B position, the R position, the N position or the D position, voltages corresponding to the B position, the R position, the N position or the D position are respectively output from IC1 to IC4. Therefore, it is determined whether the shift position Ps is the B position, the R position, the N position or the D position on the basis of voltages that are respectively output from IC1 to IC4.

When the shift positions Ps that are determined on the basis of corresponding voltages that are respectively output from the Hall ICs coincide with one another, it is determined that the shift lever 32 has been operated to the determined shift position Ps. Incidentally, as for IC2 and IC3, there are areas in which two shift positions Ps correspond to the same voltage value. For example, when the voltage value of IC3 is 3.0 V, any one of the M position and the D position corresponds to the voltage value, and the shift position Ps is not determined by IC3. In such a case, any one of the M position and the D position is determined on the basis of the shift position Ps that is determined on the basis of the other Hall ICs (IC1, IC2, IC4). For example, in the case where the shift position Ps is any one of the M position and the D position on the basis of IC3, when it is determined that the shift position Ps is the D position on the basis of all the other Hall ICs (IC1, IC2, IC4), the shift position Ps is determined as the D position. The shift position Ps may also be determined with the shift position detector 60 formed of three Hall ICs by using a method similar to that of the shift position detector 60 including the four Hall ICs according to the present embodiment, that is, on the basis of output voltages of the Hall ICs.

Incidentally, with the shift control system 10 according to the present embodiment, even when it is determined that any one of the Hall ICs is malfunctioning (hereinafter, single-sensor malfunction), the shift position Ps is determined on the basis of the remaining three Hall ICs, and limp home running is enabled on the basis of the shift position Ps. In addition, when any one or more of the other Hall ICs are also malfunctioning (hereinafter, referred to as double-sensor malfunction), different from the existing art that changes the shift range to the neutral range, limp home running is enabled by selecting a shift position on the basis of the vehicle speed V of the vehicle and the shift range kept by the drive unit 40 at the time when double-sensor malfunction is determined.

Referring back to FIG. 1, the electronic control unit 20 includes a first shift position malfunction determination unit 90, a shift position determination unit 92 and a driving force output command unit 96 as major units.

The first shift position malfunction determination unit 90 determines whether there is a malfunction in the Hall ICs on the basis of the shift position signals Pss that are output from the shift position detector 60. Specifically, when there occurs a break or a short circuit, the Hall IC is identified on the basis of the fact that a voltage value that is output from the corresponding Hall IC is 0 V or higher than or equal to 5 V. The first shift position malfunction determination unit 90 constantly calculates a differential value (deviation) among the voltages (voltage signals) of the Hall ICs, and determines whether there is a malfunction in the Hall ICs on the basis of whether the difference exceeds a preset allowable value (malfunction deviation). When the number of malfunctioning Hall ICs is one, the first shift position malfunction determination unit 90 determines the shift position Ps that is the operating position of the shift lever 32 from the Hall ICs, indicates that one malfunctioning Hall IC, and continues limp home running that is normal traveling with notification. When the number of malfunctioning Hall ICs is two or more, that is, when the number of Hall ICs that are not determined to be malfunctioning is two or less, the shift position determination unit 92 investigates whether the shift position is other than the P position. When the shift position is the P position, the driving force output command unit 96 keeps the shift position in the P position. When the shift position is other than the P position, the driving force output command unit 96 determines whether the output shaft rotation speed Nout, that is, the vehicle speed V, is higher than or equal to a vehicle speed threshold Va set in advance to, for example, about 10 Km/h. The vehicle speed threshold Va is, for example, a lower limit value of the vehicle speed at or above which an operation of the shift position to the R position is not accepted during forward traveling. When negative determination is made, the driving force output command unit 96 sets the shift position to the N position since the vehicle speed V has reached a low speed lower than the vehicle speed threshold Va. When the vehicle speed V is higher than or equal to the vehicle speed threshold Va, the shift position is kept. Thus, limp home running is enabled in the case of single-sensor malfunction. In the case of double-sensor malfunction, that is, in the case where two or more Hall ICs are malfunctioning as well, limp home running is enabled by keeping the shift position when the vehicle speed V is higher than or equal to the vehicle speed threshold Va. On the other hand, when the vehicle speed V is lower than the vehicle speed threshold Va, it is possible to avoid a situation in which the shift position is not changed to the N position and remains in the kept shift position by not allowing the vehicle to continue limp home running as a result of changing the shift position to the N position. As for the control operations that enable limp home running on the basis of the above-described shift position and vehicle speed, a method similar to the shift position detector 60 including the four Hall ICs according to the present embodiment is also applicable to the shift position detector 60 formed of three Hall ICs. That is, control operations that hold the shift position or set the shift position to the N position on the basis of the shift position and the vehicle speed at the time when sensor malfunction is determined and that keep the P range when the shift position is the P position are also applicable to the shift position detector 60 formed of three Hall ICs.

Figure 8:
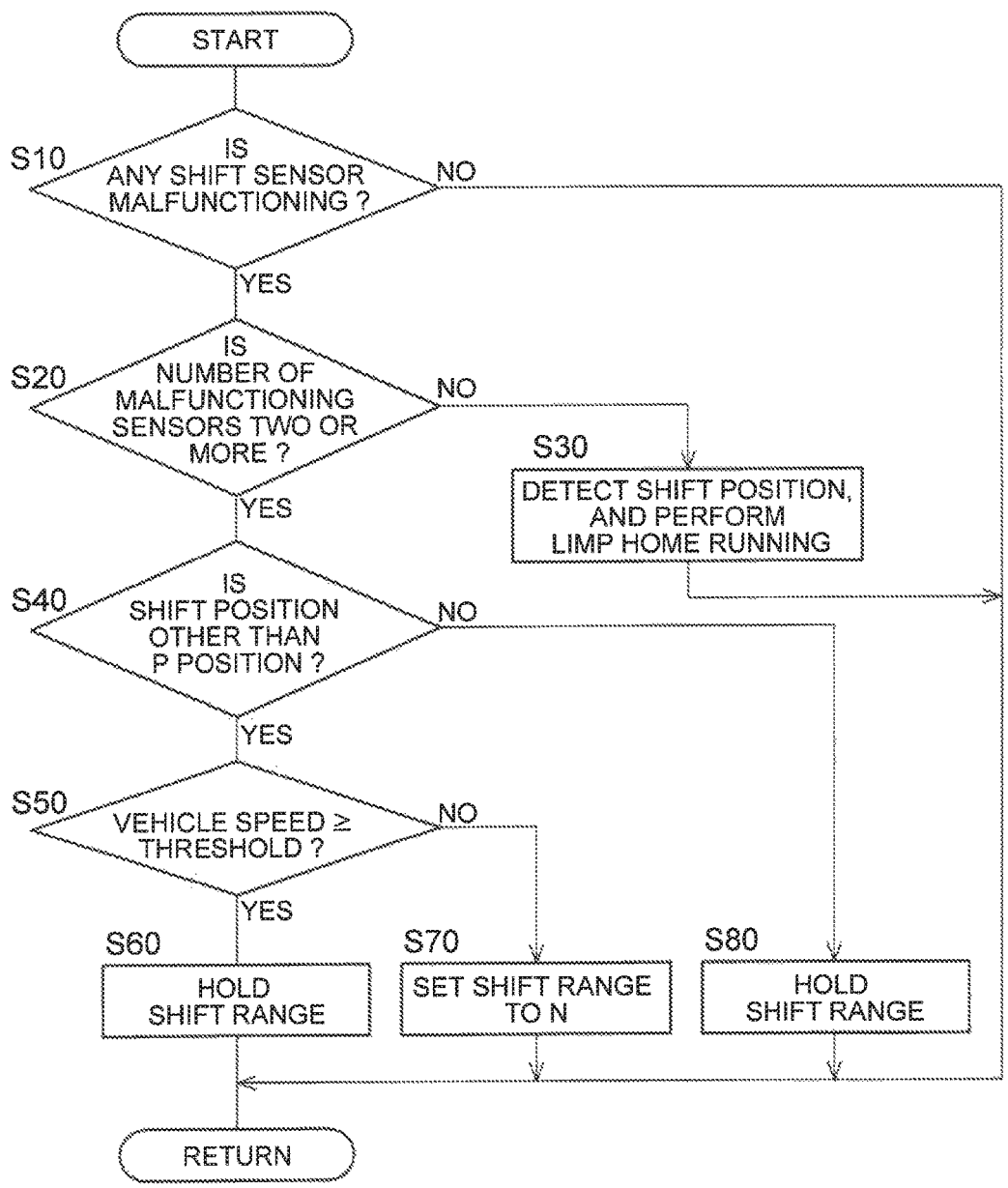
FIG. 8 is a flowchart that illustrates a relevant portion of control operations of an electronic control unit shown in FIG. 1, that is, control operations that enable limp home running on the basis of a shift range and a vehicle speed when two sensors output abnormal values.

FIG. 8 is a flowchart that illustrates a relevant portion of control operations of the electronic control unit 20, that is, control operations that enable limp home running even when two or more Hall ICs are malfunctioning. This flowchart is repeatedly executed at an extremely short cycle time of about, for example, several milliseconds to several tens of milliseconds.

In step S10 (hereinafter, step is omitted) corresponding to the function of the first shift position malfunction determination unit 90, it is determined whether there is a sensor malfunction, that is, whether there is a malfunction in the Hall ICs. When negative determination is made in S10, the routine is ended. When affirmative determination is made in S10, it is determined in S20 corresponding to the function of the first shift position malfunction determination unit 90 whether the number of malfunctioning sensors, that is, malfunctioning Hall ICs, is two or more, that is, the number of normal Hall ICs that are not determined to be malfunctioning is two or less. The malfunctioning sensors are, for example, determined on the basis of the fact that a voltage difference among the Hall ICs becomes smaller than a lower limit value of a preset normal range or larger than an upper limit value of the preset normal range (malfunction deviation) or the fact that a Hall IC of which the output voltage becomes higher than an intermediate value (2.5 V) of an output voltage range of the Hall ICs in a predetermined shift signal and a Hall IC of which the output voltage becomes lower than the intermediate value (2.5 V) of the output voltage range are not the preset Hall ICs (second malfunction deviation). When negative determination is made in S20, in S30 corresponding to the function of the first shift position malfunction determination unit 90, the shift position Ps is finally determined, one malfunctioning Hall IC is indicated, and limp home running that is normal traveling with notification is continued. When affirmative determination is made in S20, it is determined in S40 corresponding to the function of the shift position determination unit 92 whether the shift position is other than the P position. When negative determination is made in S40, that is, when the shift position is the P position, the shift position is held in the P position in S80 corresponding to the function of the driving force output command unit 96. When affirmative determination is made in S40, it is determined in S50 corresponding to the function of the driving force output command unit 96 whether the vehicle speed V is higher than or equal to, for example, the predetermined vehicle speed threshold Va. When negative determination is made in S50, the shift position is set to the N position in S70 corresponding to the function of the driving force output command unit 96. When affirmative determination is made in S50, the current shift position is held, and limp home running is selected and continued.

Figure 9:
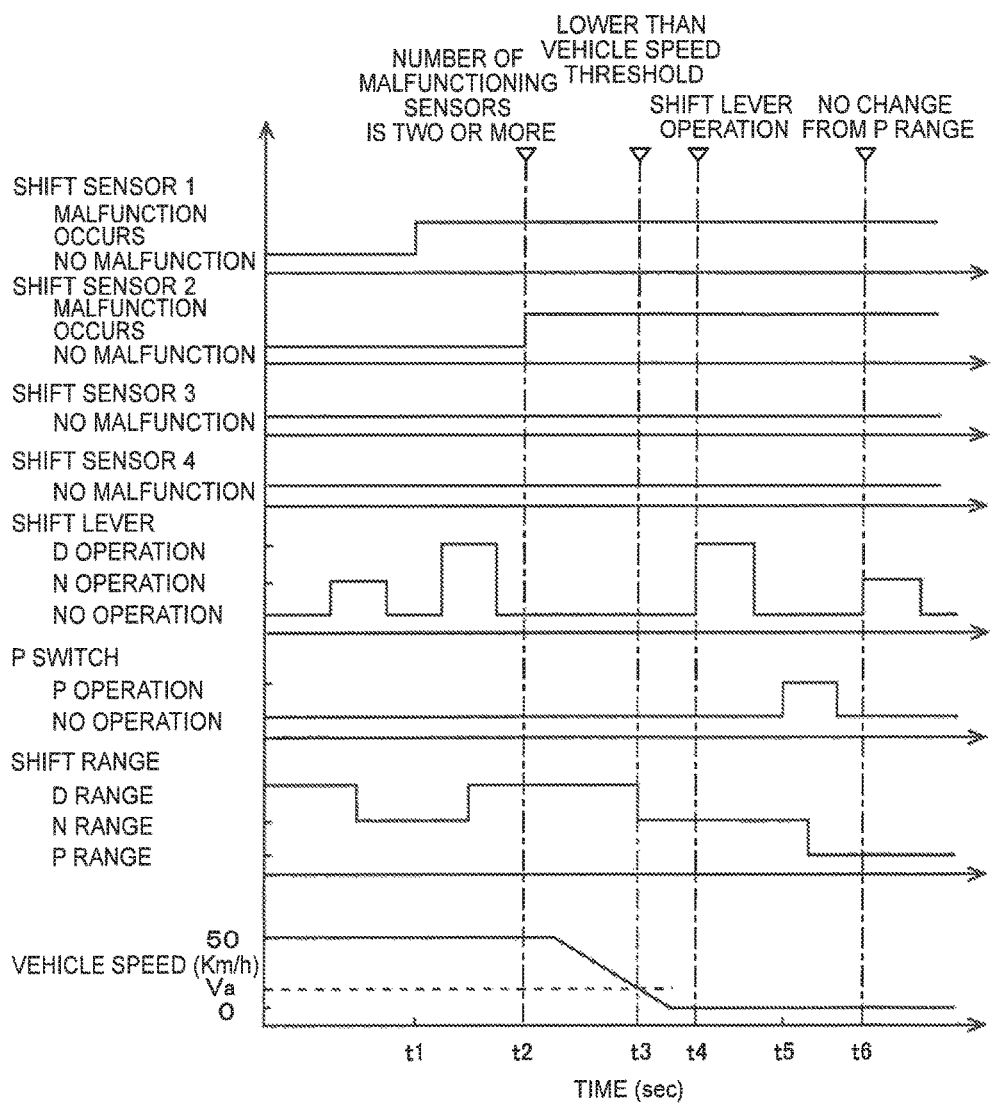
FIG. 9 is a timing chart that illustrates the control operations of the flowchart shown in FIG. 8.

FIG. 9 shows an example of a timing chart in the case where there occurs a malfunction in two Hall ICs and the number of normal Hall ICs that are not determined to be malfunctioning is two. In this example, the shift lever 32 is operated to the N position while the vehicle is traveling at substantially a constant vehicle speed V (50 Km/h), there occurs a malfunction in shift sensor 1, that is, IC1, at time t1 after the shift position is changed from the D position to the N position, the shift lever 32 is then immediately operated to the D position, and the shift position is changed from the N position to the D position. At time t2, there occurs a malfunction in shift sensor 2, that is, IC2, and the traveling mode shifts into limp home running in which the vehicle speed is reduced. When the vehicle speed V decreases and reaches a vehicle speed lower than the vehicle speed threshold Va at time t3, the shift position is changed from the D position to the N position. At time t4, the shift lever 32 is operated to the D position; however, the shift position is held in the N position. At time t5, the P switch 34 is operated, and the shift position is changed from the N position to the P position. At time t6, the shift lever 32 is operated to the N position; however, the shift position is held in the P position.

According to the present embodiment, in the shift control system 10 that determines the shift position Ps of the shift lever 32 on the basis of output signals from at least three Hall ICs, when it is determined that the number of normal Hall ICs is two or less, the shift range is selected on the basis of the already kept shift position and the vehicle speed V. Thus, appropriate limp home running is enabled. Specifically, the shift position is held as it is until the vehicle speed V reaches the vehicle speed threshold Va during limp home running, the shift position is changed to the N position at the time when the vehicle speed V becomes lower than the vehicle speed threshold Va. Thus, even when the number of normal Hall ICs is two or less, limp home running is ensured until the vehicle speed V reaches the vehicle speed threshold Va. When the vehicle speed V becomes lower than the vehicle speed threshold Va, a situation in which the shift position is not changed to the N position and remains in the kept shift position is avoided as a result of selecting the neutral range, so it is possible to safely stop with the neutral range. When the shift position is set to the P position, that is, when the P switch 34 is operated, the P position is held, so it is possible to prevent an unnecessary change of the shift range.

Next, another embodiment will be described. In the following description, like reference numerals denote portions common to those of the above-described embodiment, and the description thereof is omitted.

In the present embodiment, the first shift position malfunction determination unit 90 shown in FIG. 1 determines whether there is a double-sensor malfunction, that is, whether two or more Hall ICs are malfunctioning, that is, the number of normal Hall ICs that are not determined to be malfunctioning is two or less. When the number of malfunctioning Hall ICs is two or more, that is, when the number of Hall ICs that are not determined to be malfunctioning is two or less, the shift position determination unit 92 investigates whether the shift position is other than the P position. When the shift position is the P position, the driving force output command unit 96 keeps the shift position in the P position. When the shift position is other than the P position, the driving force output command unit 96 determines whether the output shaft rotation speed Nout, that is, the vehicle speed V, is higher than or equal to the vehicle speed threshold Va set in advance to, for example, about 10 Km/h. When negative determination is made, the driving force output command unit 96 sets the shift position to the N position on the basis of the fact that the vehicle speed V has reached a low speed lower than the vehicle speed threshold Va. When the vehicle speed V is higher than or equal to the vehicle speed threshold Va, the shift position is kept. These control operations are the same as those of the first embodiment. The shift position determination unit 92 determines whether the shift position is other than the N position or the P position. When the shift position is the N position or the P position, the driving force output command unit 96 holds the shift position, and causes the vehicle to perform limp home running with a limited driving force by executing control such that an acceleration α becomes lower than a preset constant acceleration threshold αa. The acceleration α is, for example, calculated by differentiating the output shaft rotation speed Nout with respect to time. When the shift position is a non-drive (non-traveling) position, such as the P position and the N position, the driving force output command unit 96 holds the shift range. As for the above-described control operations, control operations that use a method similar to that during traveling when there is a malfunction in one Hall IC while the vehicle is traveling with the four Hall ICs are also applicable to the shift position detector 60 formed of three Hall ICs.

Figure 10:
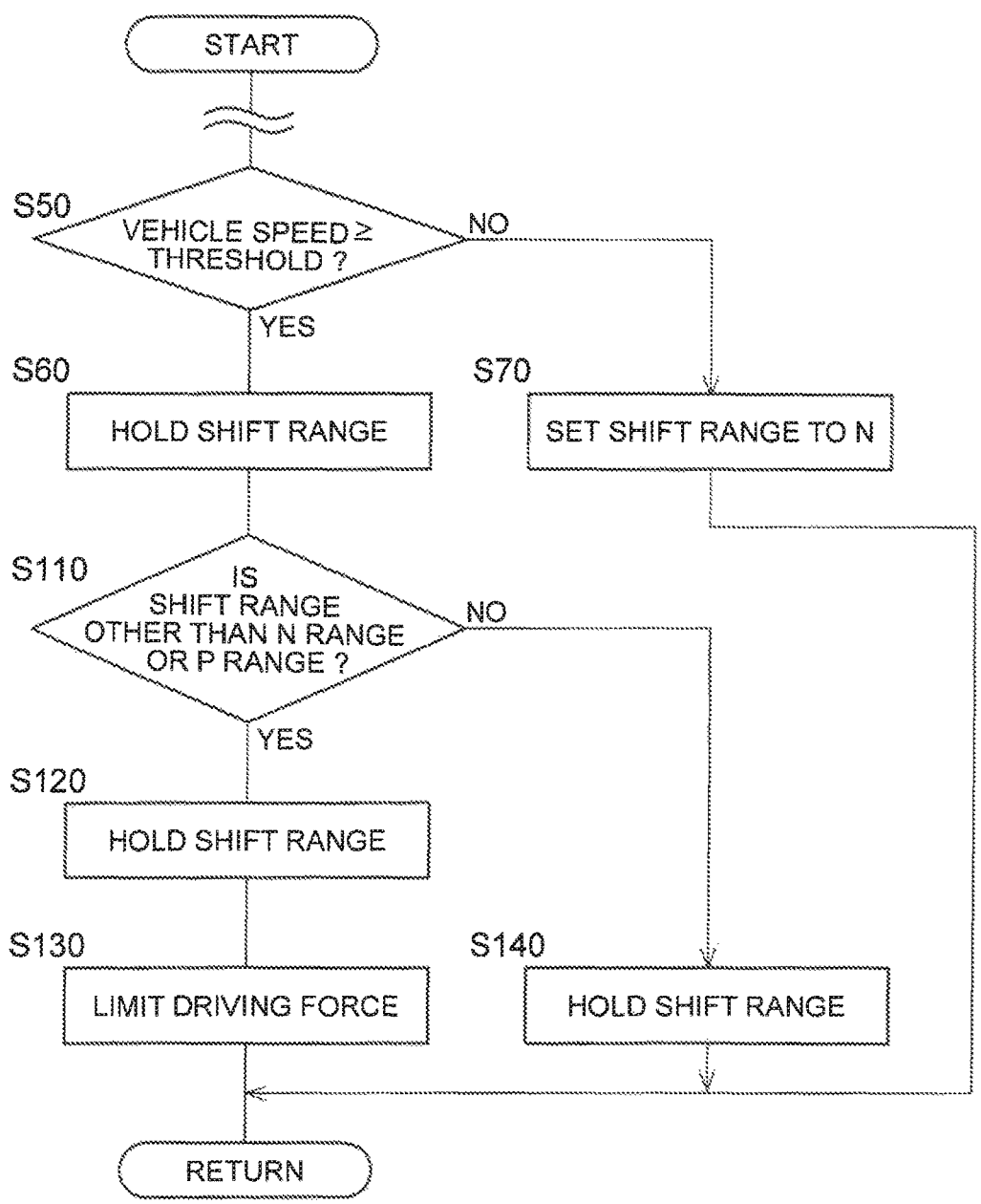
FIG. 10 is a flowchart that illustrates a relevant portion of control operations of the electronic control unit shown in FIG. 1, that is, control operations that enable limp home running by limiting a driving force when two sensors output abnormal values.

FIG. 10 is a flowchart that illustrates a relevant portion of control operations of the electronic control unit 20, that is, alternative control operations that enable limp home running even when two or more Hall ICs are malfunctioning, that is, even when the number of normal Hall ICs that are not determined to be malfunctioning is two or less. This flowchart is repeatedly executed at an extremely short cycle time of about, for example, several milliseconds to several tens of milliseconds.

The flowchart according to the present embodiment in FIG. 10 includes the same steps as S10 to S80 of FIG. 8, but S10 to S40 and S80 are omitted from the flowchart of FIG. 10. In S110 corresponding to the function of the shift position determination unit 92, it is determined whether the shift position is other than the N position or the P position, that is, other than the non-drive position. When affirmative determination is made in S110, that is, when the shift position is any one of the D position, the B position and the R position that are drive positions, the current shift position is kept in S120 corresponding to the function of the driving force output command unit 96, and limp home running with a limited driving force is started by setting the acceleration α to a value lower than the predetermined constant acceleration threshold as in S130 corresponding to the function of the driving force output command unit 96. When negative determination is made in S110, the shift position is held in the shift position till then, that is, the N position or the P position is held, in S140 corresponding to the function of the driving force output command unit 96.

Figure 11:
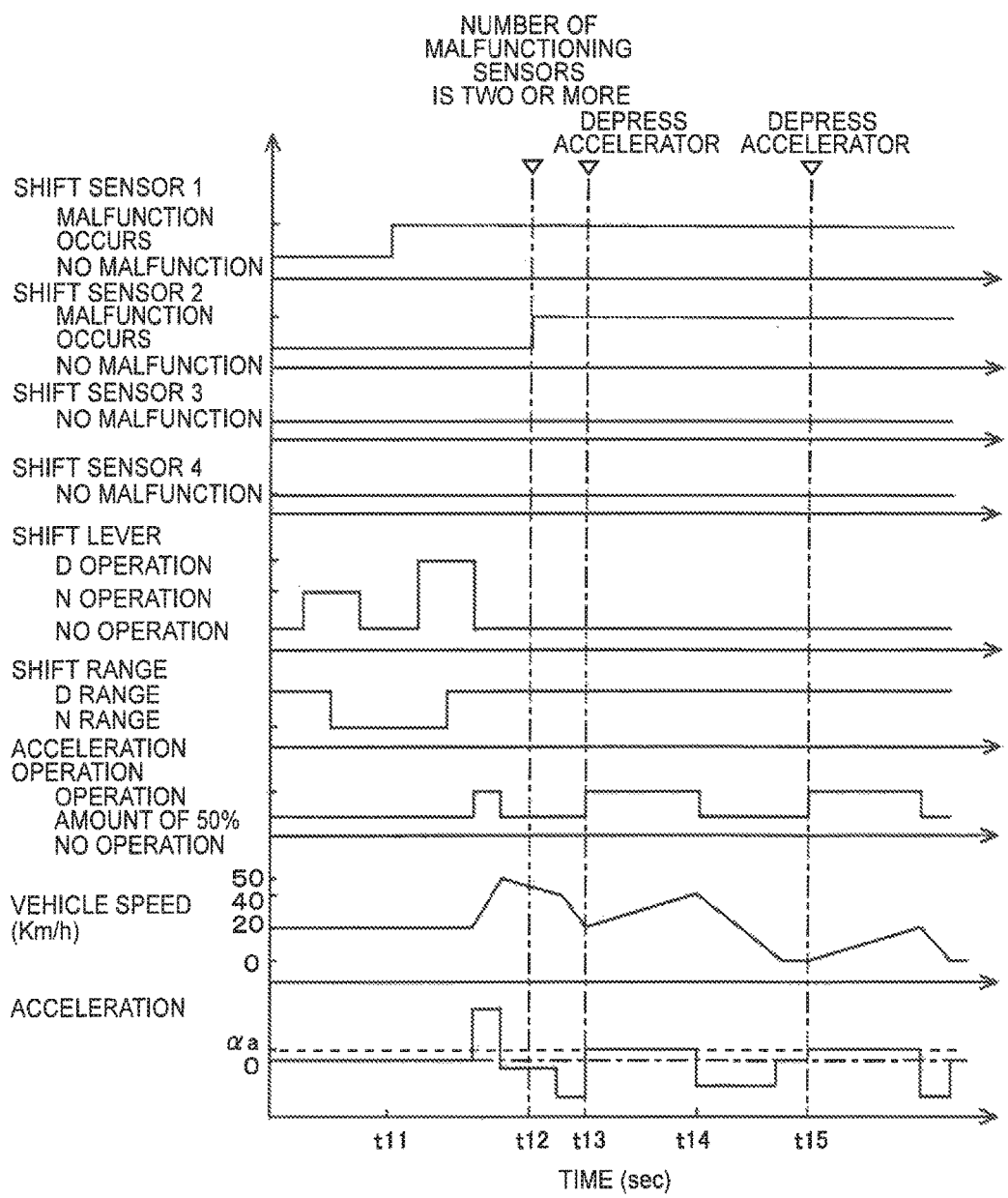
FIG. 11 is a timing chart that illustrates the control operations of the flowchart shown in FIG. 10.

FIG. 11 shows an example of a timing chart in the case where there occurs a malfunction in two Hall ICs. In this example, the shift lever 32 is operated to the N position while the vehicle is traveling at substantially a constant vehicle speed V (20 Km/h), there occurs a malfunction in shift sensor 1, that is, IC1, at time t11 after the shift position is changed from the D position to the N position, the shift lever 32 is then immediately operated to the D position, and the shift position is changed from the N position to the D position. The accelerator operation amount becomes 50% as a result of depression of an accelerator pedal for a short time, the acceleration α also increases in a short time, and the vehicle speed V increases from 20 Km/h to 50 Km/h. The accelerator operation amount becomes substantially zero and is gently reducing. At time t12, there occurs a double-sensor malfunction, that is, there occurs a malfunction also in shift sensor 2, that is, IC2, control that sets the acceleration α to a value lower than the acceleration threshold αa is started. At time t13, the accelerator pedal is depressed at an accelerator operation amount of 50%, and the acceleration is kept below the acceleration threshold as that is an upper limit value. Depression of the accelerator pedal at an accelerator operation amount of 50% is kept until time t14, and the acceleration α is kept below the acceleration threshold as through control for limiting the acceleration. At time t14, depression of the accelerator pedal is released, and the vehicle speed V reduces and then indicates a constant low speed. At time t15, the accelerator pedal is depressed again at an accelerator operation amount of 50%; however, the acceleration is limited to a value lower than the acceleration threshold as that is the upper limit value, so just a gentle increase in the vehicle speed V is indicated.

According to the present embodiment, in the shift control system 10 that determines the shift position of the shift lever 32 on the basis of output signals from at least three Hall ICs, when it is determined that the number of normal Hall ICs is two or less, and when the shift position is the N position or the P position, that is, the non-drive position, the shift position is held. When the shift position is any one of the D position, the B position and the R position, driving force control is executed such that the acceleration α becomes lower than the predetermined constant acceleration threshold αa while the shift position is held. Thus, limp home running at a low acceleration is enabled, so safe limp home running from a failure occurrence place to a remote vehicle stopping place is possible.

The embodiments are described in detail with reference to the accompanying drawings; however, the disclosure is also applicable to other modes.

The shift operating device 30 according to the above-described embodiments has no manual shift mode; however, the disclosure is not limited to this configuration. The shift operating device 30 may include an M position or S position in which a manual shift mode for executing manual shift control on the basis of a manual operation of the shift lever 32 is selected.

Arrangement of the shift positions Ps in the shift operating device according to the above-described embodiments is just an example, and may be modified as needed. The shift lever 32 is of a momentary type; however, the shift lever 32 is not always limited to a momentary type.

As measures against the case where there occurs a malfunction in two or more Hall ICs, in the first embodiment, the shift position is set to the N position when the vehicle speed V is lower than the vehicle speed threshold Va, and the shift position is held when the vehicle speed is higher than or equal to the vehicle speed threshold Va. When the shift position is the P position, the P position is held. In the second embodiment, when the shift position is the drive position, a driving force, that is, the acceleration $\alpha$, is limited to a value lower than the acceleration threshold $\alpha a$. When there is a malfunction in two or more Hall ICs, that is, when the number of normal Hall ICs that are not determined to be malfunctioning is two or less, any one of the above-described measures may be used solely or may be used in combination or all the measures may be used.

The above-described embodiments are only illustrative. The disclosure may be implemented in modes including various modifications or improvements on the basis of the knowledge of persons skilled in the art.

What is claimed is:

1. A shift control system for a vehicle, the shift control system comprising:
   at least three sensors;
   a shift operating unit; and
   an electronic control unit configured to determine a shift position of the shift operating unit based on signals that are respectively output from the at least three sensors, wherein
   the electronic control unit is configured such that, when the electronic control unit determines that a number of non-malfunctioning sensors is two or less among the at least three sensors and a vehicle speed of the vehicle is higher than or equal to a preset vehicle speed threshold, the electronic control unit selects a shift position kept at the time of the determination, and
   the electronic control unit is configured such that, when the electronic control unit determines that the number of non-malfunctioning sensors is two or less among the at least three sensors and the vehicle speed of the vehicle is lower than the vehicle speed threshold, the electronic control unit selects a neutral position.

2. The shift control system according to claim 1, wherein the electronic control unit is configured to keep a parking position when the shift position kept at the time of the determination is the parking position.

3. The shift control system according to claim 1, wherein when the shift position is other than a parking position or the neutral position, the electronic control unit is configured to limit a driving force such that an acceleration of the vehicle becomes lower than a preset acceleration threshold.

4. A shift control method for a vehicle, the vehicle including at least three sensors, a shift operating unit, and an electronic control unit, the shift control method comprising:
   determining, by the electronic control unit, a shift position of the shift operating unit based on signals that are respectively output from the at least three sensors;
   when the electronic control unit determines that a number of non-malfunctioning sensors is two or less among the at least three sensors and a vehicle speed of the vehicle is higher than or equal to a preset vehicle speed threshold, selecting the shift position kept at the time of the determination by the electronic control unit; and
   when the electronic control unit determines that the number of non-malfunctioning sensors is two or less among the at least three sensors and the vehicle speed of the vehicle is lower than the vehicle speed threshold, selecting, by the electronic control unit, a neutral position.

* * * * *